US012712110B2

(12) United States Patent
Chang et al.

(10) Patent No.: US 12,712,110 B2
(45) Date of Patent: Aug. 18, 2026

(54) MAGNETIC COMPONENT

(71) Applicant: CYNTEC CO., LTD., Hsinchu (TW)

(72) Inventors: Shao-Wei Chang, Hsinchu (TW); Chu-Keng Lin, Hsinchu (TW); Hung-Chih Lin, Hsinchu (TW); Hsieh-Shen Hsieh, Hsinchu (TW)

(73) Assignee: CYNTEC CO., LTD., Hsinchu (TW)

( * ) Notice: Subject to any disclaimer, the term of this patent is extended or adjusted under 35 U.S.C. 154(b) by 1195 days.

(21) Appl. No.: 17/691,081

(22) Filed: Mar. 9, 2022

(65) Prior Publication Data

US 2022/0301756 A1 Sep. 22, 2022

Related U.S. Application Data

(60) Provisional application No. 63/162,562, filed on Mar. 18, 2021.

(51) Int. Cl.
*H01F 27/02* (2006.01)
*H01F 17/06* (2006.01)
*H01F 27/32* (2006.01)
*H01F 41/02* (2006.01)

(52) U.S. Cl.
CPC ......... *H01F 27/022* (2013.01); *H01F 17/062* (2013.01); *H01F 27/325* (2013.01); *H01F 41/0246* (2013.01)

(58) Field of Classification Search
CPC ..... H01F 27/022; H01F 17/062; H01F 27/325
USPC ........................................................... 336/90
See application file for complete search history.

(56) References Cited

U.S. PATENT DOCUMENTS 8,102,228 B2 * 1/2012 Okamoto ................ H01F 37/00 336/67
8,749,335 B2 * 6/2014 Ueno .................... H01F 27/306 336/212
9,147,516 B2 * 9/2015 Suzuki .................... H01F 27/02
9,343,221 B2 * 5/2016 Nakatsu .................. H01F 37/00
11,817,253 B2 11/2023 Chien
2003/0080844 A1 * 5/2003 Nishikawa ................ H01F 3/14 336/178
2005/0279299 A1 12/2005 Degner
2008/0174393 A1 7/2008 Schnetzka
(Continued)

FOREIGN PATENT DOCUMENTS

CN 206148256 U 5/2017
JP 10-70032 A 3/1998
(Continued)

*Primary Examiner* — Shawki S Ismail
*Assistant Examiner* — Joselito S. Baisa
(74) *Attorney, Agent, or Firm* — Winston Hsu

(57) ABSTRACT

A magnetic component includes a first core component, a second core component and at least one coil. The first core component includes a first molding bobbin covering a first part of a core set by an injection molding process. The second core component includes a second molding bobbin covering a second part of the core set by the injection molding process. The first core component is assembled with the second core component to form a first pillar and a second pillar. Each of the first pillar and the second pillar includes a plurality of cores stacked with each other in a direction toward an outside or inside of the magnetic component. The at least one coil is wound on at least one of the first pillar and the second pillar.

18 Claims, 14 Drawing Sheets

(56) References Cited

U.S. PATENT DOCUMENTS

| | | | | |
|---|---|---|---|---|
| 2009/0108971 | A1 * | 4/2009 | Okamoto | H01F 27/266 336/65 |
| 2009/0278646 | A1 * | 11/2009 | Chen | H01F 27/325 336/177 |
| 2012/0206232 | A1 * | 8/2012 | Yamamoto | H01F 3/14 336/210 |
| 2013/0249666 | A1 | 9/2013 | Suzuki | |
| 2014/0293655 | A1 * | 10/2014 | Inaba | H01F 3/08 336/90 |
| 2015/0035636 | A1 | 2/2015 | Nakatsu | |
| 2015/0043262 | A1 | 2/2015 | Ito | |
| 2015/0123490 | A1 | 5/2015 | Rooyakkers | |
| 2015/0287525 | A1 | 10/2015 | Yamada | |
| 2016/0233015 | A1 | 8/2016 | Nakatsu | |
| 2017/0053737 | A1 | 2/2017 | Kurs | |
| 2017/0194087 | A1 | 7/2017 | Yamamoto | |
| 2017/0323718 | A1 | 11/2017 | Foley | |
| 2019/0385776 | A1 | 12/2019 | Yamamoto | |
| 2020/0126710 | A1 | 4/2020 | Inaba | |

FOREIGN PATENT DOCUMENTS

| | | | | |
|---|---|---|---|---|
| JP | 2009-26995 | A | | 2/2009 |
| JP | 2010-238798 | A | | 10/2010 |
| JP | 2011082412 | A | * | 4/2011 |
| JP | 2013-115321 | A | | 6/2013 |
| JP | 2013-175566 | A | | 9/2013 |
| JP | 2015005579 | A | * | 1/2015 |
| JP | 2015-32718 | A | | 2/2015 |
| JP | 2016-82043 | A | | 5/2016 |
| JP | 2017-28135 | A | | 2/2017 |
| JP | 2017163068 | A | * | 9/2017 |
| JP | 2018-129501 | A | | 8/2018 |
| TW | 200919913 | | | 5/2009 |
| TW | 201743348 | A | | 12/2017 |
| TW | 202042258 | A | | 11/2020 |
| WO | 2014/069312 | A1 | | 5/2014 |
| WO | 2015/186674 | A1 | | 12/2015 |

* cited by examiner

MAGNETIC COMPONENT

CROSS REFERENCE TO RELATED APPLICATIONS

This application claims the benefit of U.S. Provisional Application No. 63/162,562, which was filed on Mar. 18, 2021 and is incorporated herein by reference.

BACKGROUND OF THE INVENTION

1. Field of the Invention

The invention relates to a magnetic component and, more particularly, to a magnetic component utilizing an injection molding process to form a molding bobbin covering a core set.

2. Description of the Related Art

A magnetic component is an important electric component used for storing energy, converting energy and isolating electricity. In most of circuits, there is always a magnetic component installed therein. In general, the magnetic component mainly comprises a reactor, a transformer and an inductor. In a conventional magnetic component, a bobbin, a core and a spacer are assembled by adhesion. However, the assembly process is complicated due to too many components. The stack of the tolerances of the components makes the overall tolerance of the assembly too large, such that it is difficult to control the screw fastening position, the electrical characteristics are poor, the appearance is skewed, the size cannot be miniaturized, the amount of potting glue increases, and the process time increases, thereby resulting in cost or size waste.

SUMMARY OF THE INVENTION

The invention provides a magnetic component utilizing an injection molding process to form a molding bobbin covering a core set, so as to solve the aforesaid problems.

According to an embodiment of the invention, a magnetic component comprises a first core component, a second core component and at least one coil. The first core component comprises a first molding bobbin covering a first part of a core set by an injection molding process. The second core component comprises a second molding bobbin covering a second part of the core set by the injection molding process. The first core component is assembled with the second core component to form a first pillar and a second pillar. Each of the first pillar and the second pillar comprises a plurality of cores stacked with each other in a direction toward an outside of the magnetic component. A joint of the first pillar has a first gap and a joint of the second pillar has a second gap, wherein the first gap is larger than the second gap. The at least one coil is wound on at least one of the first pillar and the second pillar.

According to another embodiment of the invention, a magnetic component comprises a first core component, a second core component and at least one coil. The first core component comprises a first molding bobbin covering a first part of a core set by an injection molding process. The second core component comprises a second molding bobbin covering a second part of the core set by the injection molding process. The first core component is assembled with the second core component to form a first pillar and a second pillar. Each of the first pillar and the second pillar comprises a plurality of cores stacked with each other in a direction toward an inside of the magnetic component. A length of the first pillar is larger than a length of the second pillar. The at least one coil is wound on at least one of the first pillar and the second pillar.

As mentioned in the above, the invention utilizes the injection molding process to form the first molding bobbin and the second molding bobbin covering the core set and then assembles the first core component with the second core component to form the first pillar and the second pillar. In an embodiment, the invention may stack the cores with each other in a direction toward an outside of the magnetic component, so as to form the first gap and the second gap at the joints of the first pillar and the second pillar, wherein the first gap is larger than the second gap. The first gap and the second gap can be used to absorb the tolerances of the cores or/and spacer sheets, so as to reduce the length difference between the first pillar and the second pillar. Accordingly, the lengths of the first pillar and the second pillar will be substantially the same after assembly. Furthermore, since the shape tolerance of the core set or/and spacer sheet set is small after assembly, the molding bobbin may be thinner to reduce the height or width of the magnetic component. In another embodiment, the invention may stack the cores with each other in a direction toward an inside of the magnetic component, so as to make the length of the first pillar larger than the length of the second pillar, thereby reducing the tolerance of the gap within the first pillar and the second pillar, or/and reducing the tolerance of the magnetic path. In this embodiment, the molding bobbin may be thicker to maintain the shape of the magnetic component, such that the magnetic component will not be affected by the shape tolerance of the core set or/and spacer sheet set after assembly.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
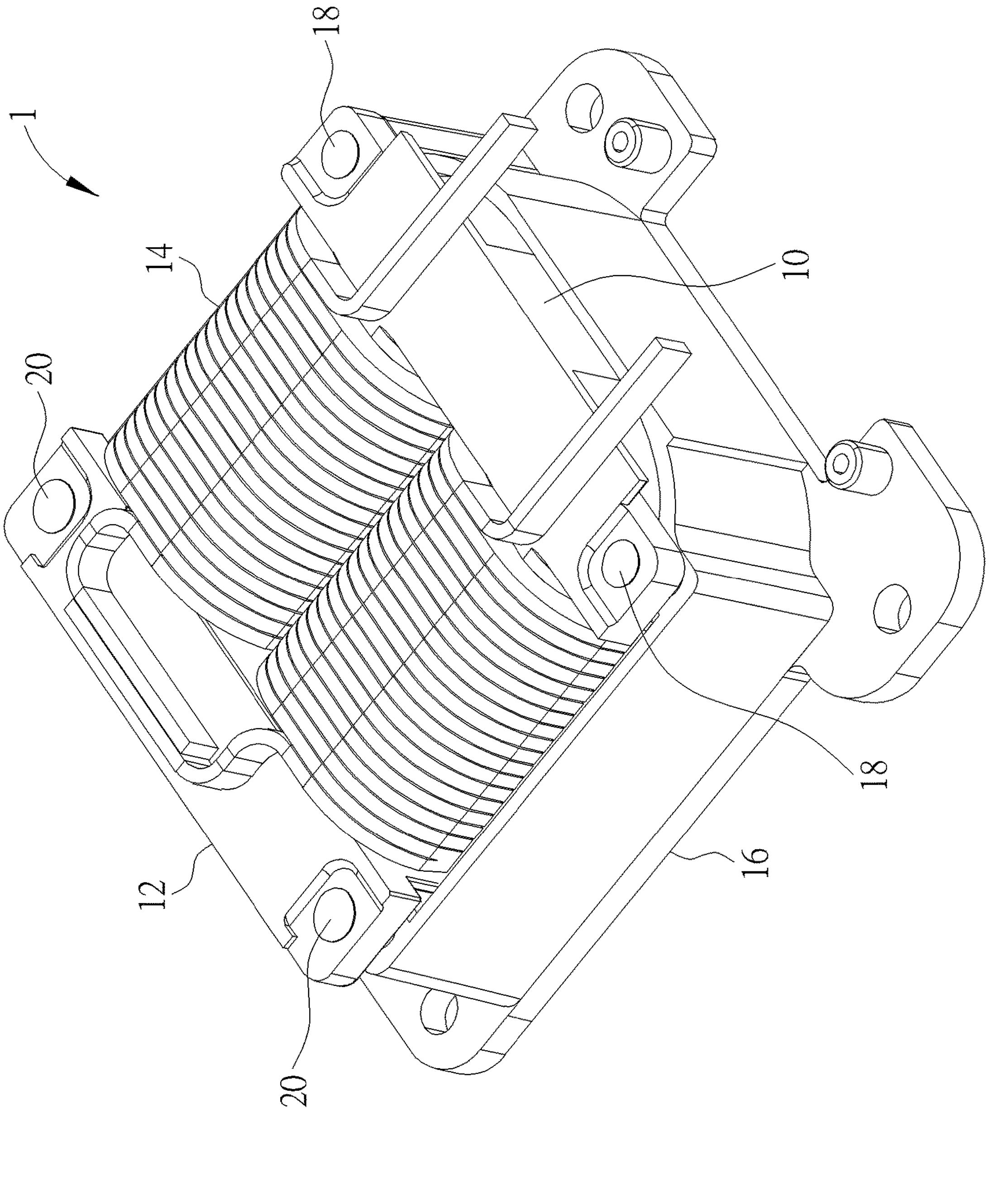
FIG. 1 is a perspective view illustrating a magnetic component according to an embodiment of the invention.
Figure 2:
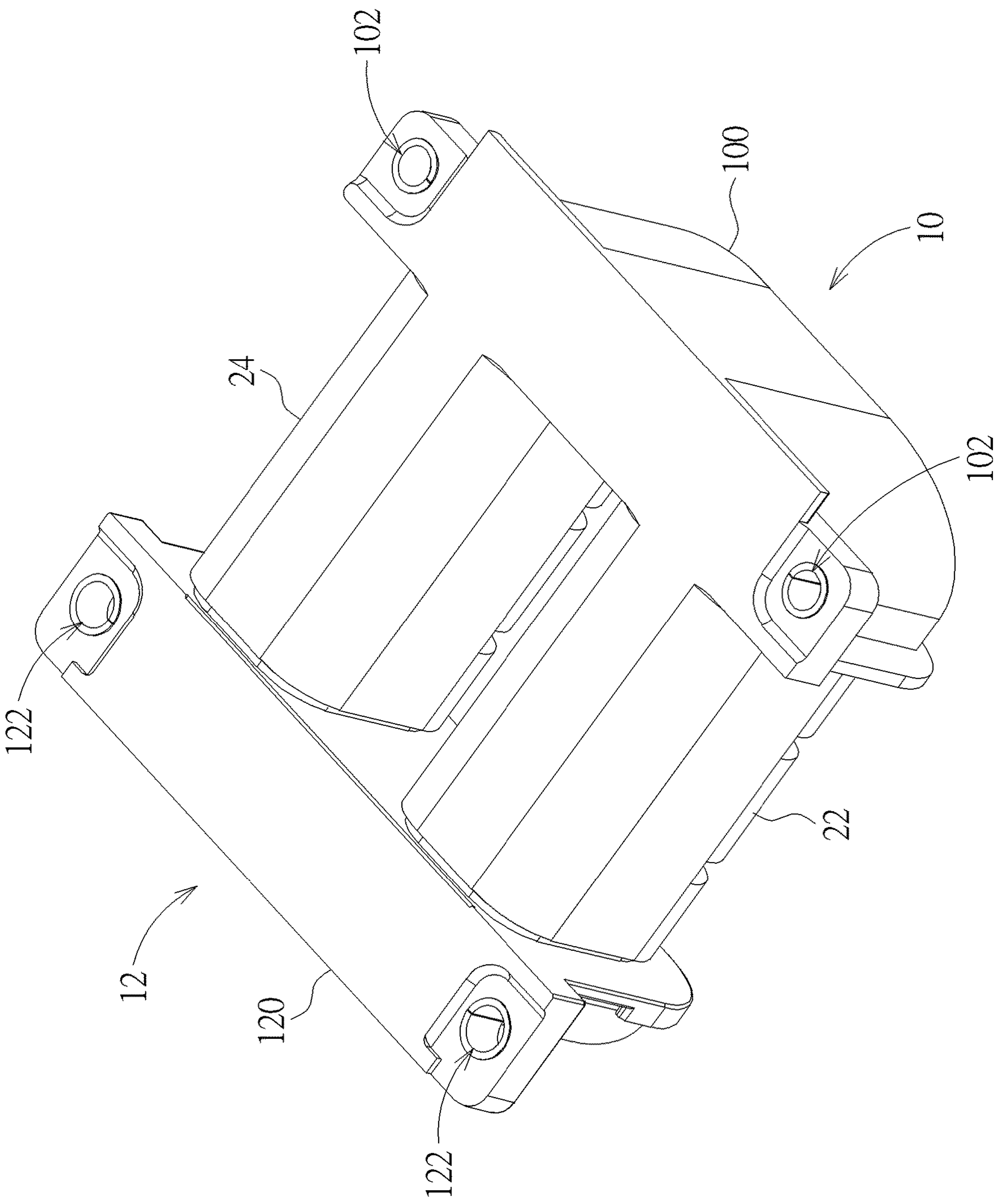
FIG. 2 is an assembly view illustrating a first core component and a second core component shown in FIG. 1.
Figure 3:
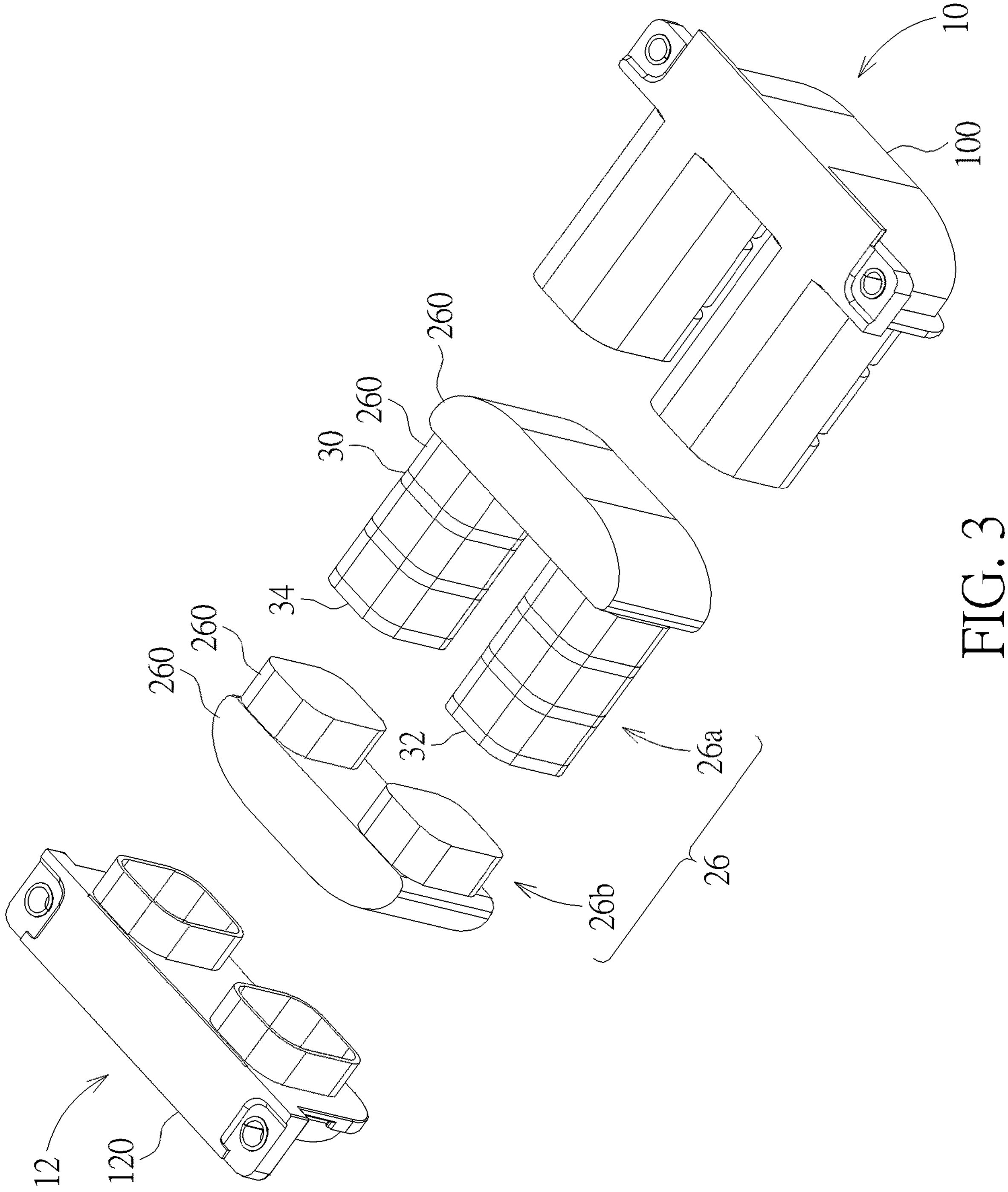
FIG. 3 is an exploded view illustrating the first core component and the second core component shown in FIG. 2.
Figure 4:
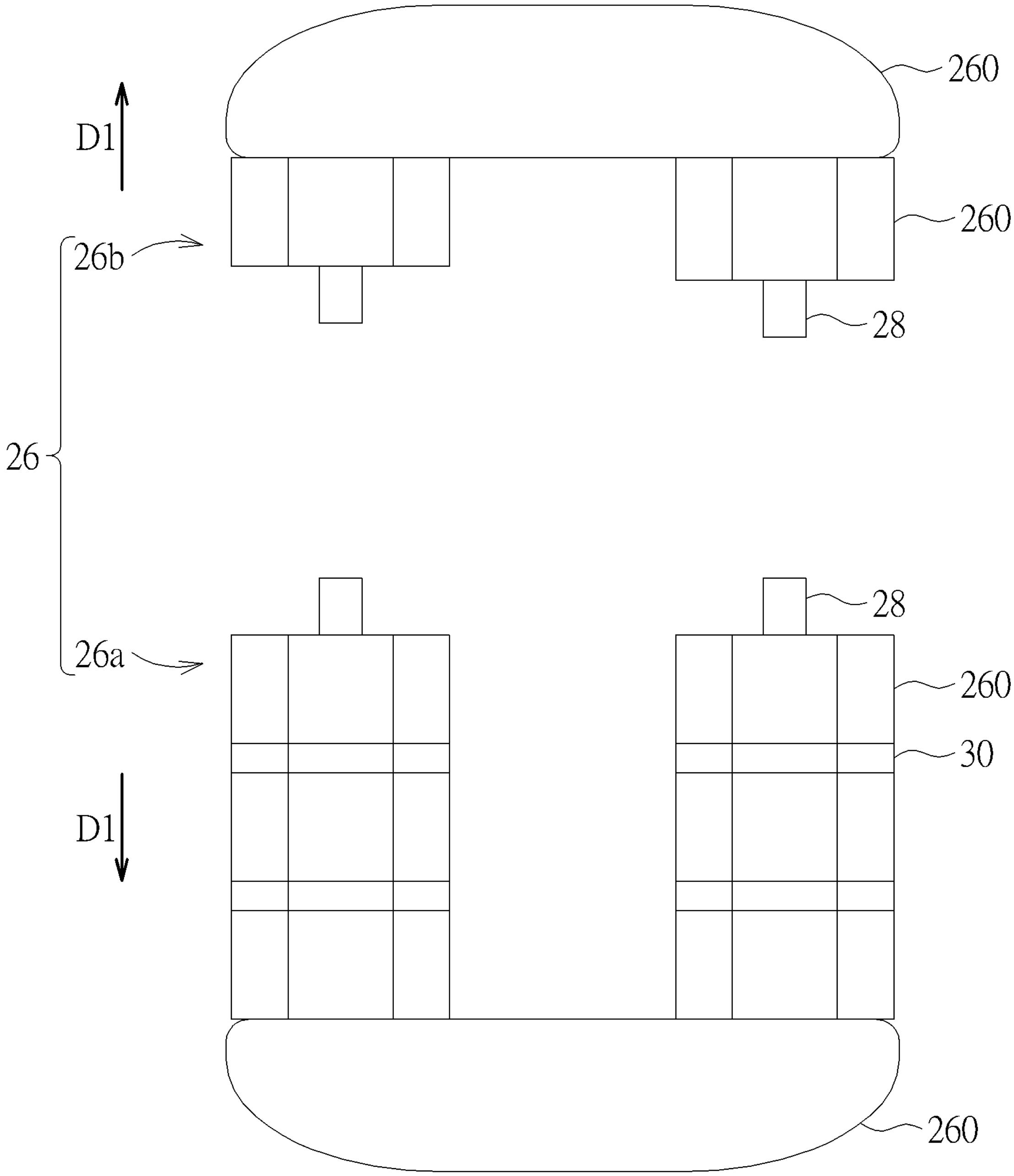
FIG. 4 is a front view illustrating a core set shown in FIG. 3.
Figure 5:
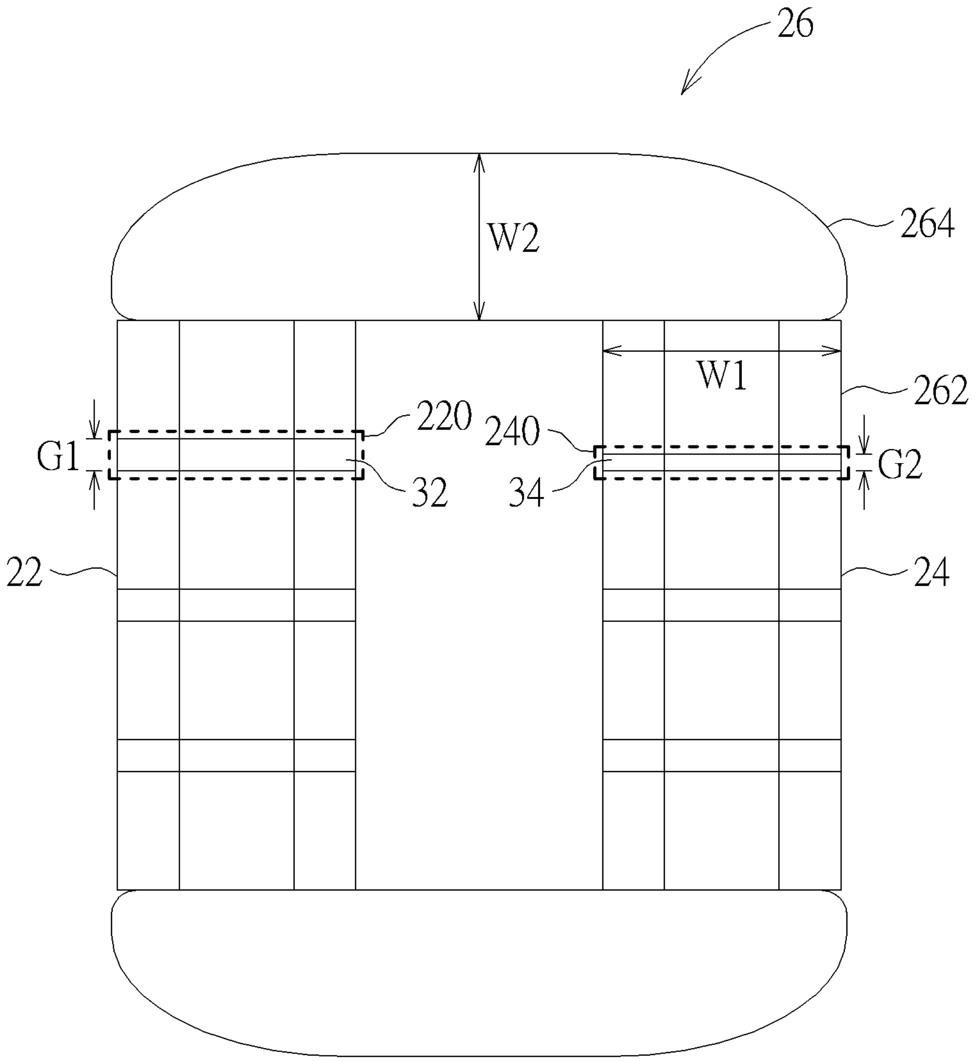
FIG. 5 is an assembly view illustrating the core set shown in FIG. 4.
Figure 6:
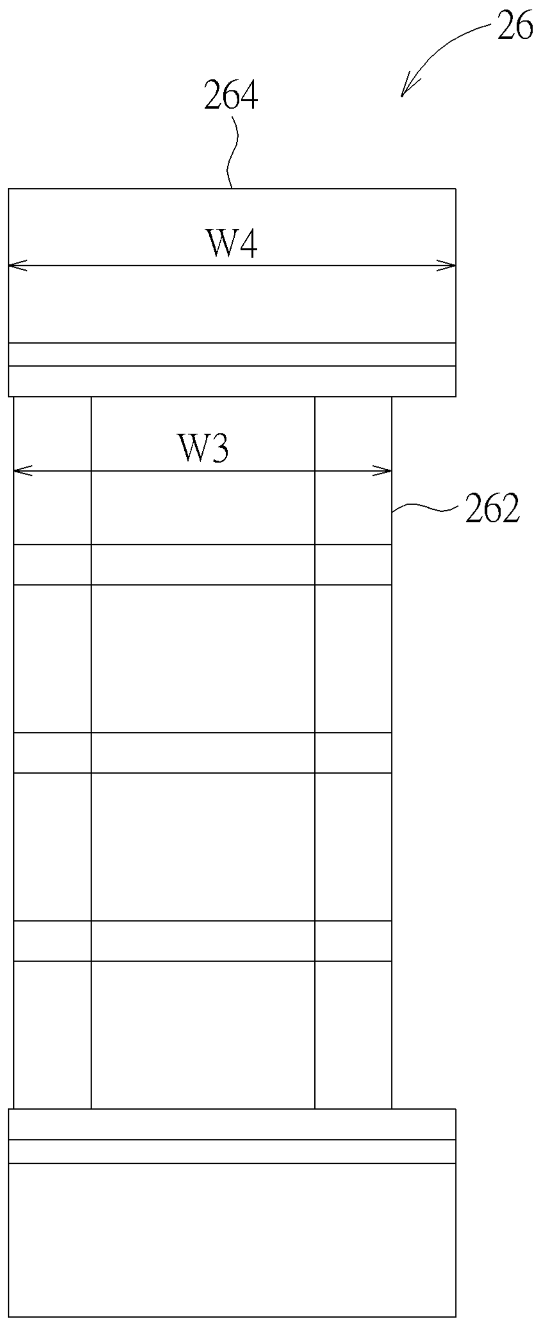
FIG. 6 is a side view illustrating the core set shown in FIG. 5.

Referring to FIGS. 1 to 6, FIG. 1 is a perspective view illustrating a magnetic component 1 according to an embodiment of the invention, FIG. 2 is an assembly view illustrating a first core component 10 and a second core component 12 shown in FIG. 1, FIG. 3 is an exploded view illustrating the first core component 10 and the second core component 12 shown in FIG. 2, FIG. 4 is a front view illustrating a core set 26 shown in FIG. 3, FIG. 5 is an assembly view illustrating the core set 26 shown in FIG. 4, and FIG. 6 is a side view illustrating the core set 26 shown in FIG. 5.

The magnetic component 1 of the invention may be a reactor, a transformer, an inductor or other magnetic components. As shown in FIGS. 1 to 3, the magnetic component 1 comprises a first core component 10, a second core component 12, at least one coil 14, a base 16, a first fixing component 18 and a second fixing component 20. The first core component 10 is assembled with the second core component 12 to form a first pillar 22 and a second pillar 24. The first fixing component 18 is configured to fix the first core component 10 on the base 16, and the second fixing component 20 is configured to fix the second core component 12 on the base 16. The first fixing component 18 and the second fixing component 20 may be, but are not limited to, screws or bolts. In this embodiment, the joints of the first core component 10 and the second core component 12 may be opposite to each other without being fixed, such that the space between the first core component 10 and the second core component 12 may be used to absorb volume expansion of the first core component 10 and the second core component 12 due to temperature variation. The coil 14 is wound on at least one of the first pillar 22 and the second pillar 24. In this embodiment, two coils are respectively wound on the first pillar 22 and the second pillar 24.

As shown in FIG. 3, the first core component 10 comprises a first molding bobbin 100 and a first part 26*a* of a core set 26, and the second core component 12 comprises a second molding bobbin 120 and a second part 26*b* of the core set 26. In this embodiment, the core set 26 comprises a plurality of cores 260, wherein the cores 260 maybe divided into the first part 26*a* of the first core component 10 and the second part 26*b* of the second core component 12.

As shown in FIGS. 1 and 2, the first fixing component 18 may fix the first core component 10 on the base 16 through a fixing hole 102 of the first molding bobbin 100, and the second fixing component 20 may fix the second core component 12 on the base 16 through a fixing hole 122 of the second molding bobbin 120. In this embodiment, the fixing holes 102, 122 maybe circular holes or regular polygonal holes, such that the first molding bobbin 100 and the second molding bobbin 120 are fixed and immovable after the first fixing component 18 and the second fixing component 20 passes through the fixing holes 102, 122 to be fixed to the base 16.

The invention utilizes an injection molding process to form the first molding bobbin 100 covering the first part 26*a* of the core set 26 and form the second molding bobbin 120 covering the second part 26*b* of the core set 26. As shown in FIG. 4, the invention may place the first part 26*a* of the core set 26 into a mold (not shown). In the mold, an ejector pin 28 abuts against the cores 260, such that the cores 260 are stacked with each other in a direction D1 toward an outside of the magnetic component 1. Then, the invention performs an injection molding process to form the first molding bobbin 100 covering the first part 26*a* of the core set 26. Similarly, as shown in FIG. 4, the invention may place the second part 26*b* of the core set 26 into another mold (not shown). In the mold, an ejector pin 28 abuts against the cores 260, such that the cores 260 are stacked with each other in a direction D1 toward an outside of the magnetic component 1. Then, the invention performs an injection molding process to form the second molding bobbin 120 covering the second part 26*b* of the core set 26. Accordingly, after the first core component 10 is assembled with the second core component 12, each of the first pillar 22 and the second pillar 24 comprises a plurality of cores 260 stacked with each other in the direction D1 toward the outside of the magnetic component 1.

Since the first pillar 22 and the second pillar 24 are formed by stacking a plurality of small cores 260, the invention can reduce the mold cost of manufacturing the core 260 and increase the life span of the mold, so as to reduce the cost of the core 260 and increase the yielding rate. However, each of the cores 260 or spacer sheets has an individual tolerance. After the first core component 10 is assembled with the second core component 12, the individual tolerances of the cores or/and spacer sheets will be accumulated, such that the lengths of the first pillar 22 and the second pillar 24 may be different. To solve the aforesaid problem, the invention stacks the cores 260 with each other in the direction D1 toward the outside of the magnetic component 1, so as to form a first gap G1 at a joint 220 of the first pillar 22 and form a second gap G2 at a joint 240 of the second pillar 24, as shown in FIG. 5. Therefore, after the first core component 10 is assembled with the second core component 12, the joint 220 of the first pillar 22 has the first gap G1 and the joint 240 of the second pillar 24 has the second gap G2, wherein the first gap G1 is larger than the second gap G2 due to different tolerances of the cores 240 or/and spacer sheets. The first gap G1 and the second gap G2 can be used to absorb the tolerances of the cores 240 or/and spacer sheets, so as to reduce the length difference between the first pillar 22 and the second pillar 24. Accordingly, the lengths of the first pillar 22 and the second pillar 24 will be substantially the same after assembly. Furthermore, since the shape tolerance of the core set 26 is small after assembly, the first and second molding bobbins 100, 120 may be thinner to reduce the height or width of the magnetic component 1.

Since the first molding bobbin 100 and the second molding bobbin 120 can be tightly attached to the cores 260 without gap by the injection molding process, the rigidity of the overall structure of the magnetic component 1 is relatively increased, and the risk of failure of the reliability test, such as the mechanical shock or vibration, is also reduced. Furthermore, the tolerance of each component has been absorbed after the injection molding process. The appearance dimension of the magnetic component 1 is stable and precise, and the gap between the first core component 10, the second core component 12 and the base 16 is also relatively stable, so the invention can effectively control the amount of potting glue. If the amount of glue is controlled, the potting time can also be stable, thereby saving the time for adding the glue.

It should be noted that, in some embodiments, two adjacent cores 260 at the joint 240 of the second pillar 24 may contact each other, such that the second gap G2 may be zero.

In this embodiment, the magnetic component 1 may further comprise a first spacer structure 32 and a second spacer structure 34. As shown in FIG. 5, the first spacer structure 32 is disposed in the first gap G1 and the second spacer structure 34 is disposed in the second gap G2. Since the first gap G1 is larger than the second gap G2, a thickness of the first spacer structure 32 is larger than a thickness of the second spacer structure 34. In this embodiment, the first spacer structure 32 and the second spacer structure 34 may be injection molding materials formed by the injection molding process. In another embodiment, the first spacer structure 32 and the second spacer structure 34 maybe spacer sheets. If the first spacer structure 32 and the second spacer structure 34 are spacer sheets, the first spacer structure 32 and the second spacer structure 34 maybe stacked with the cores 260 in the mold first and then the injection molding process is performed to form the first and second molding bobbins 100, 120.

In this embodiment, the shapes of the first core component 10 and the second core component 12 may be determined according to the number of the cores 240. For example, the shapes of the first core component 10 and the second core component 12 maybe U-shape, J-shape, L-shape, I-shape or other shapes. Preferably, the shape of the first core component 10 may be identical to the shape of the second core component 12 (e.g. U-shape or J-shape), such that the first core component 10 and the second core component 12 may share one single mold to save the cost of the other mold. In this embodiment, the magnetic component 1 may further comprise a plurality of spacer sheets 30, wherein each of the spacer sheets 30 is located between two of the cores 260. The spacer sheet 30 maybe made of non-magnetic material or made of magnetic material with a magnetic permeability lower than the core set 26. The cores 260 and the spacer sheets 30 maybe connected by adhesive or connected by the injection molding process according to practical applications. In an embodiment, the first spacer structure 32 and the second spacer structure 34 may be omitted form the joints 220, 240.

As shown in FIGS. 5 and 6, the core set 26 has a winding portion 262 and a non-winding portion 264. In this embodiment, a first width W1 of the winding portion 262 is larger than a second width W2 of the non-winding portion 264, a third width W3 of the winding portion 262 is smaller than a fourth width W4 of the non-winding portion 264, and a product of the first width W1 and the third width W3 is equal to a product of the second width W2 and the fourth width W4 (i.e. W1*W3=W2*W4). In this embodiment, the fourth width W4 is larger than the third width W3. When the fourth width W4 increases, the second width W2 can decrease, such that the overall height of the magnetic component 1 can be reduced.

Figure 7:
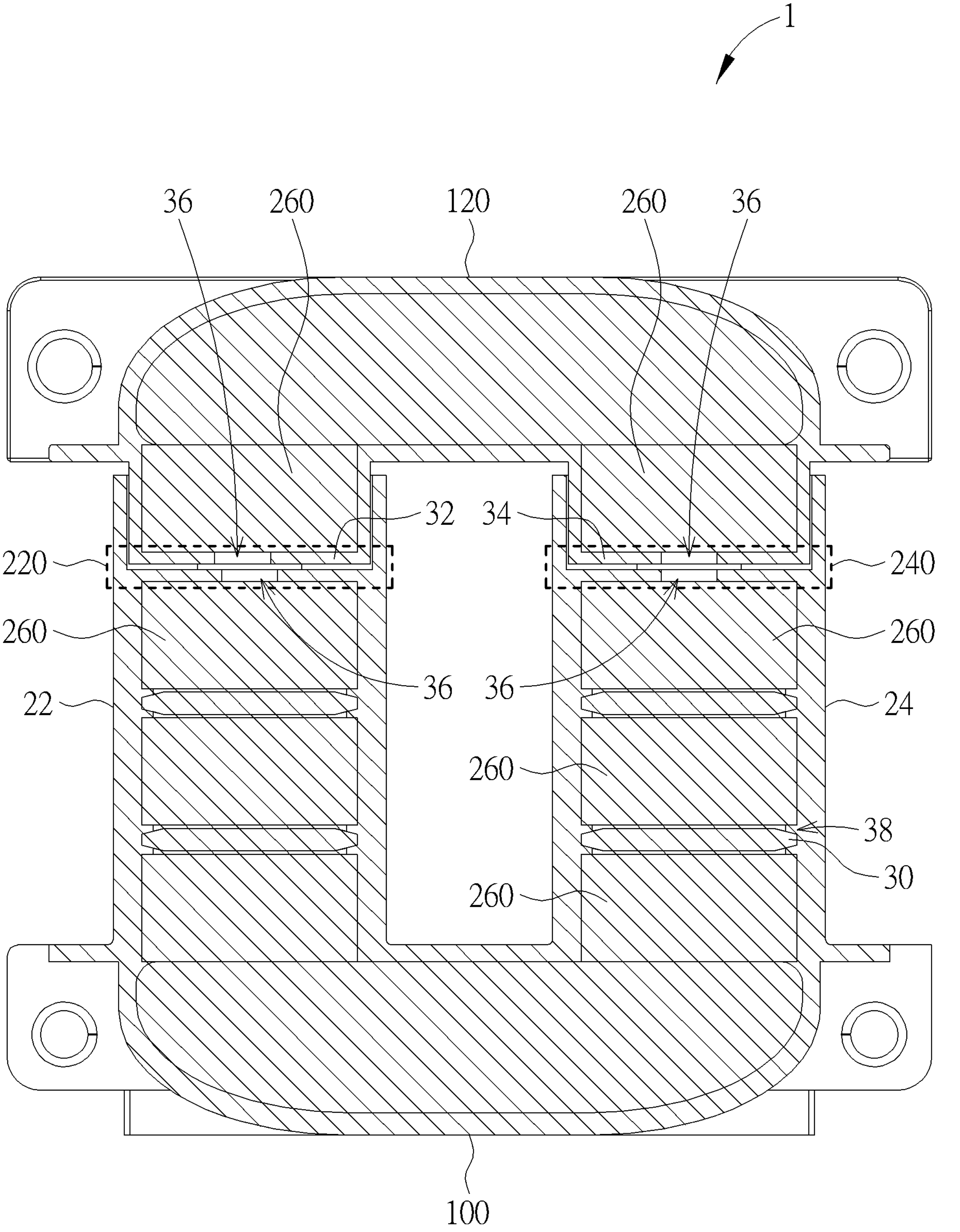
FIG. 7 is a sectional view illustrating a magnetic component according to another embodiment of the invention.

Referring to FIG. 7, FIG. 7 is a sectional view illustrating a magnetic component 1 according to another embodiment of the invention.

As shown in FIG. 7, each of the joints 220, 240 of the first pillar 22 and the second pillar 24 has an opening 36. The position of the opening 36 corresponds to the position of the ejector pin 28 shown in FIG. 4 and the opening 36 is formed during the injection molding process. After the injection molding process, one of the cores 260 is exposed from the opening 36. It should be noted that the invention may dispose more ejector pins at other positions in the mold, such that parts of the cores 260 will be exposed after the injection molding process to improve heat dissipating efficiency. Furthermore, a filling space 38 may exist between the core 260 and an indented structure of the spacer sheet 30, such that an injection molding material will be filled in the filling space 38 by the injection molding process. Accordingly, the cores 260 and the spacer sheets 30 may be connected by the injection molding process. It should be noted that, the shape of the spacer sheet 30 may be determined according to practical applications, so the invention is not limited to the embodiment shown in the figure. Moreover, the first molding bobbin 100 and the second molding bobbin 120 further form the first spacer structure 32 and the second spacer structure 34 during the injection molding process. Since the first molding bobbin 100 and the second molding bobbin 120 can completely cover the cores 260 with the injection molding material (e.g. plastic), the creepage distance of safety regulations can be completely ignored.

Figure 8:
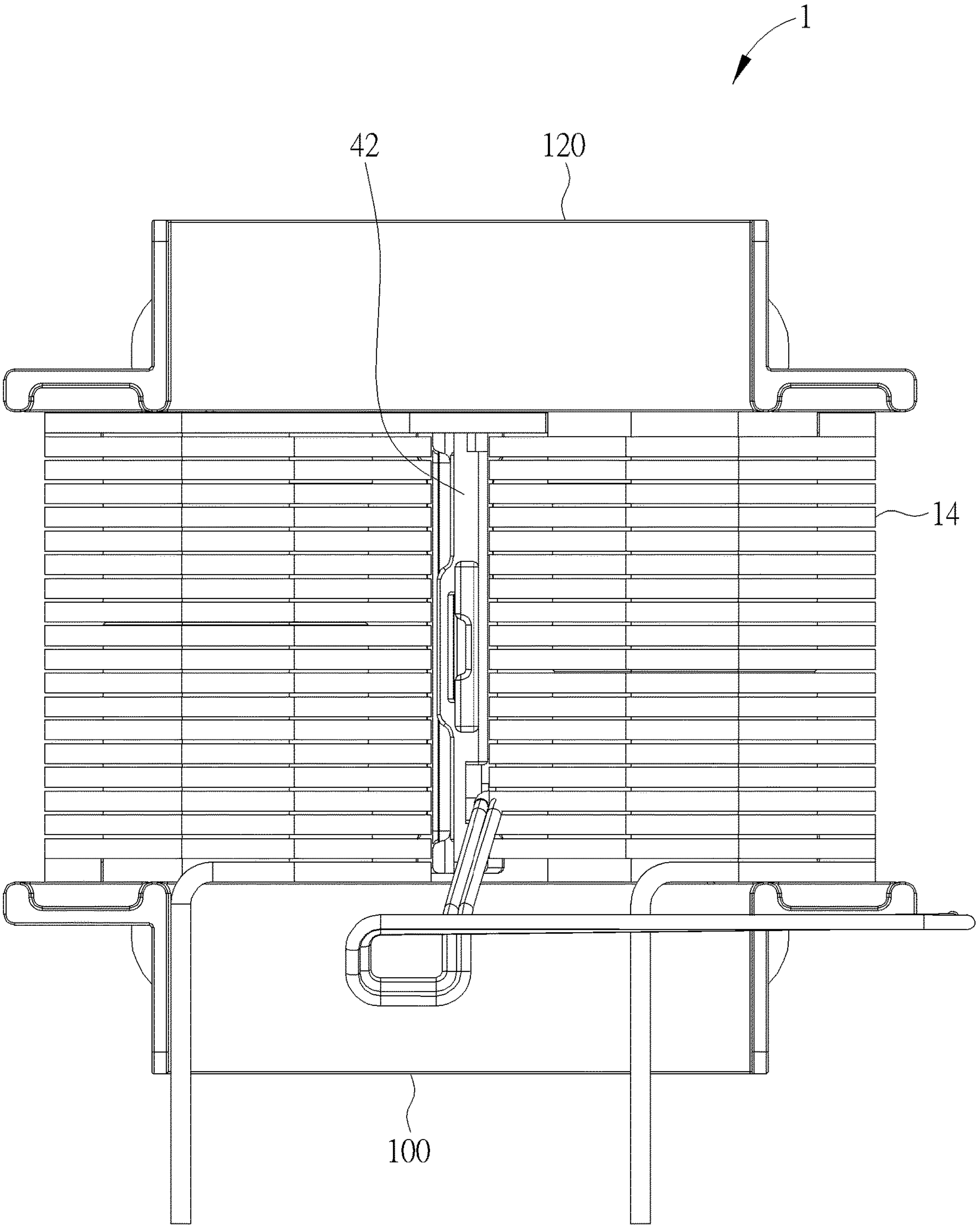
FIG. 8 is a front view illustrating a magnetic component according to another embodiment of the invention.
Figure 9:
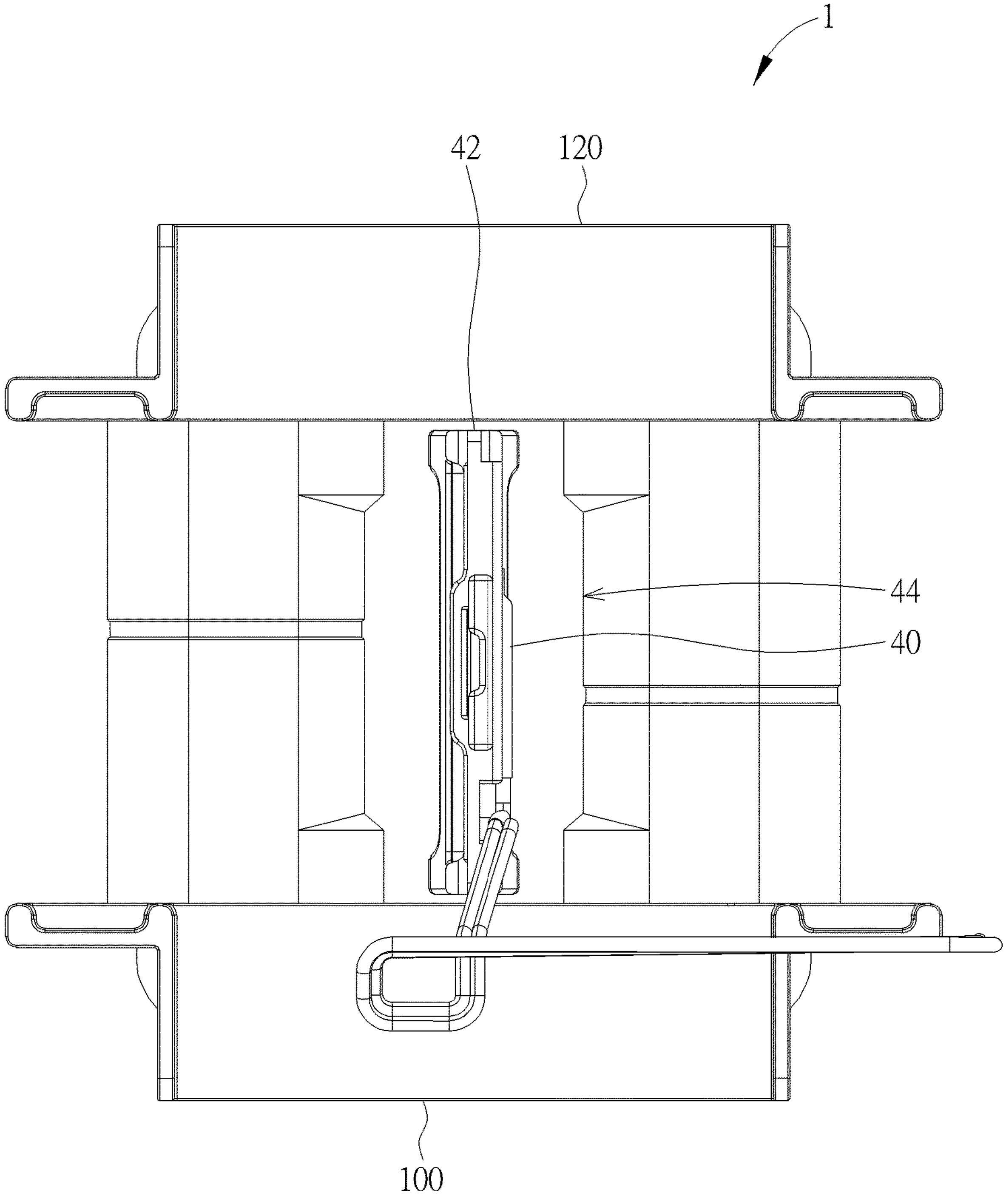
FIG. 9 is a front view illustrating the magnetic component shown in FIG. 8 without the coil.

Referring to FIGS. 8 and 9, FIG. 8 is a front view illustrating a magnetic component 1 according to another embodiment of the invention and FIG. 9 is a front view illustrating the magnetic component 1 shown in FIG. 8 without the coil 14.

As shown in FIGS. 8 and 9, the magnetic component 1 may further comprise a temperature sensor 40 and a holder 42. The temperature sensor 40 is disposed on the holder 42 and the holder 42 is disposed between the coils 14, such that the temperature sensor 40 is disposed adjacent to one of the coils 14. Furthermore, at least one recess 44 is formed on at least one inner surface of the first molding bobbin 100 and the second molding bobbin 120, and the temperature sensor 40 is disposed at a position corresponding to the at least one recess 44. In this embodiment, two recesses 44 are formed on opposite inner surfaces of the first molding bobbin 100 and the second molding bobbin 120, but the invention is not so limited. Preferably, the temperature sensor 40 interferes with the coil 14 to ensure that the temperature sensor 40 measures the temperature of the magnetic component 1 precisely. The recess 44 is configured to accommodate at least a part of the coil 14. When the volume of all components increases due to heat or tolerance, at least a part of the coil 14 may extend to the recess 14, such that the recess 44 absorbs the tolerance and thermal expansion of all components, so as to prevent the temperature sensor 40 from being damaged. It should be noted that in addition to the first and second molding bobbins 100, 120, the recess 44 may also be applied to an assembly-type bobbin.

Figure 10:
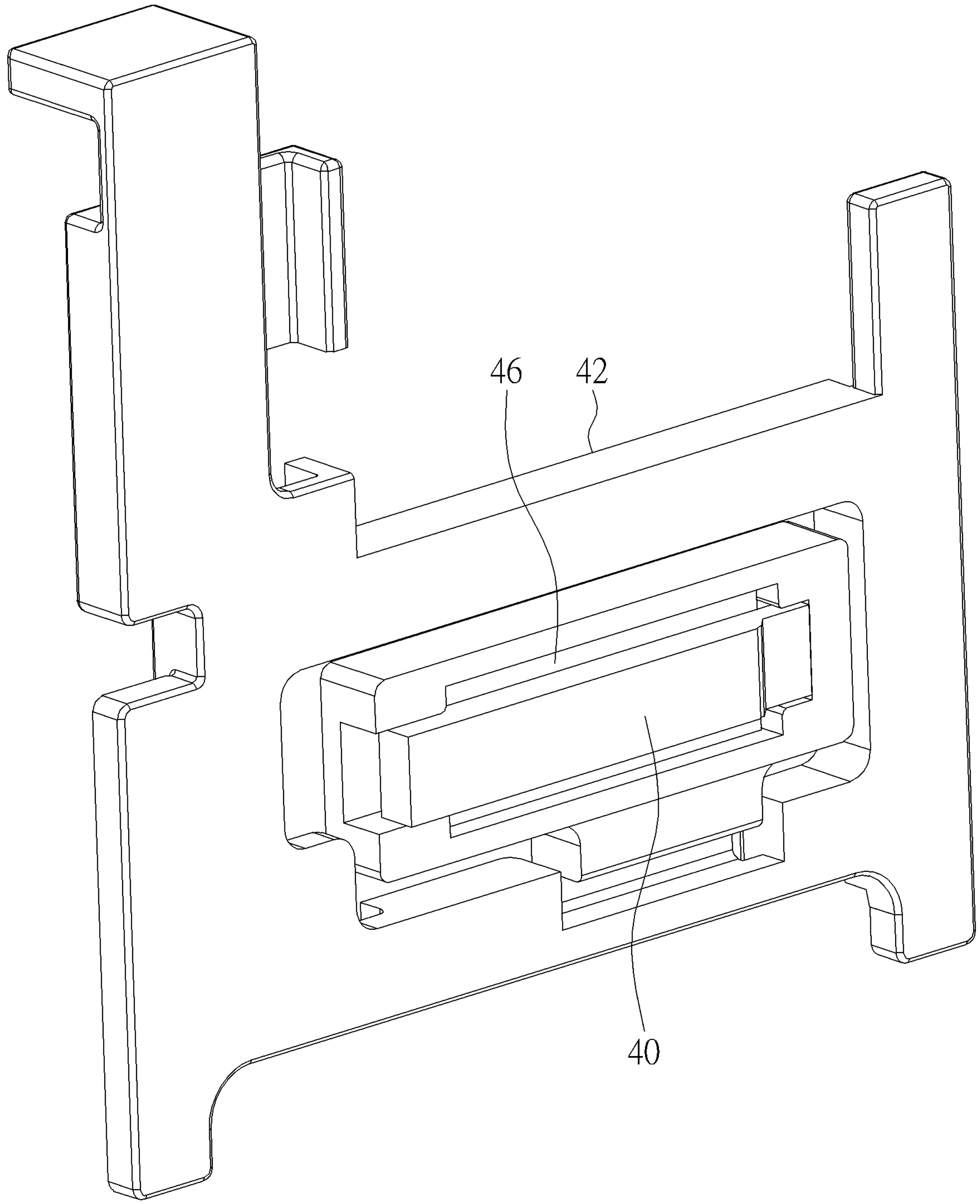
FIG. 10 is a perspective view illustrating the temperature sensor disposed on the holder.
Figure 11:
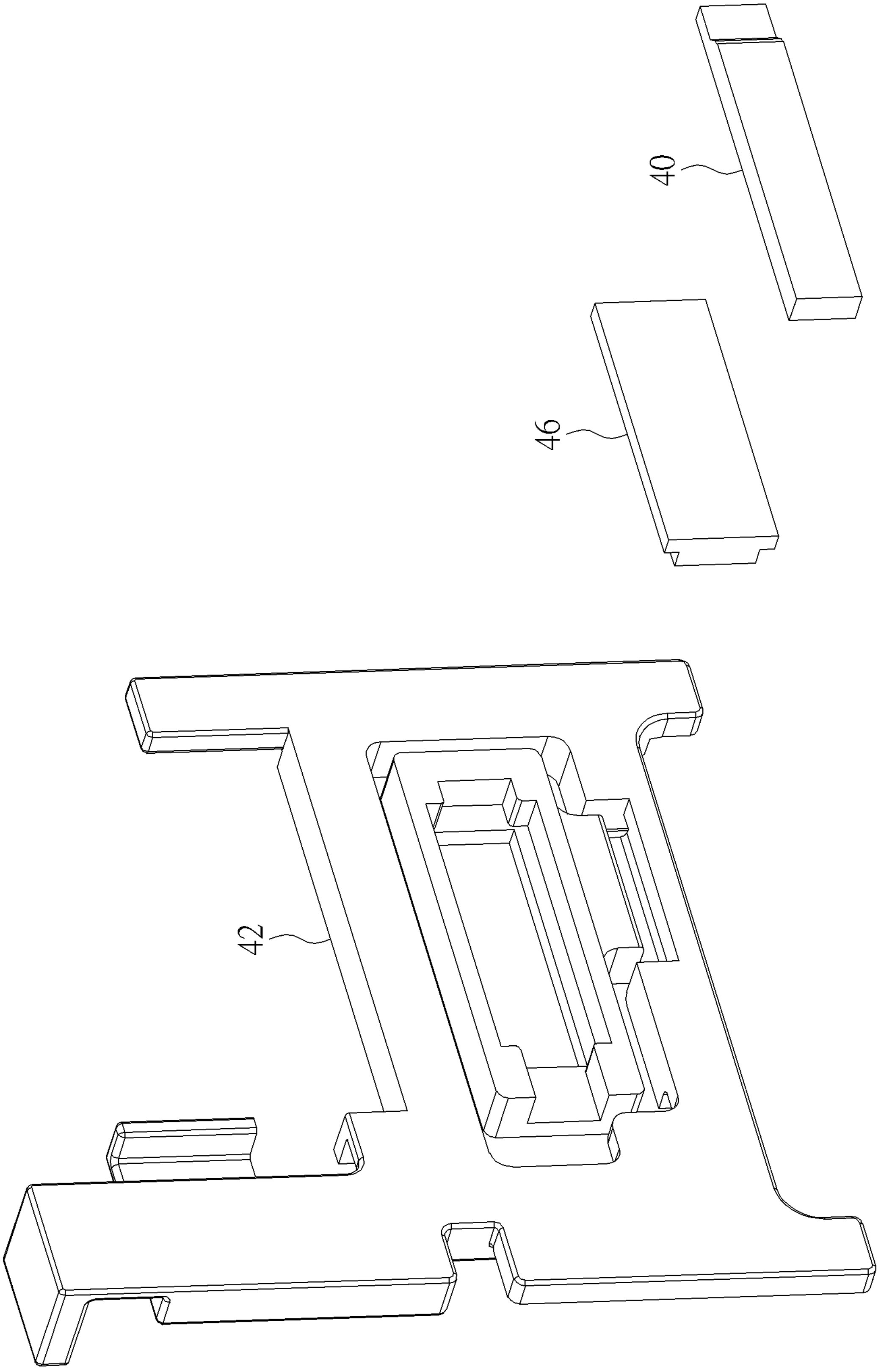
FIG. 11 is an exploded view illustrating the temperature sensor, the holder and a thermal conductive member.

Referring to FIGS. 10 and 11, FIG. 10 is a perspective view illustrating the temperature sensor 40 disposed on the holder 42 and FIG. 11 is an exploded view illustrating the temperature sensor 40, the holder 42 and a thermal conductive member 46.

As shown in FIG. 11, the magnetic component 1 may further comprise a thermal conductive member 46. The thermal conductive member 46 may be, but is not limited to, a ceramic plate. The thermal conductive member 46 is disposed on the holder 42 and the temperature sensor 40 is disposed on the thermal conductive member 46, as shown in FIG. 10. Accordingly, the temperature of the magnetic component 1 can be effectively conducted to the temperature sensor 40 through the thermal conductive member 46, so as to effectively measure the highest temperature of the magnetic component 1.

Figure 12:
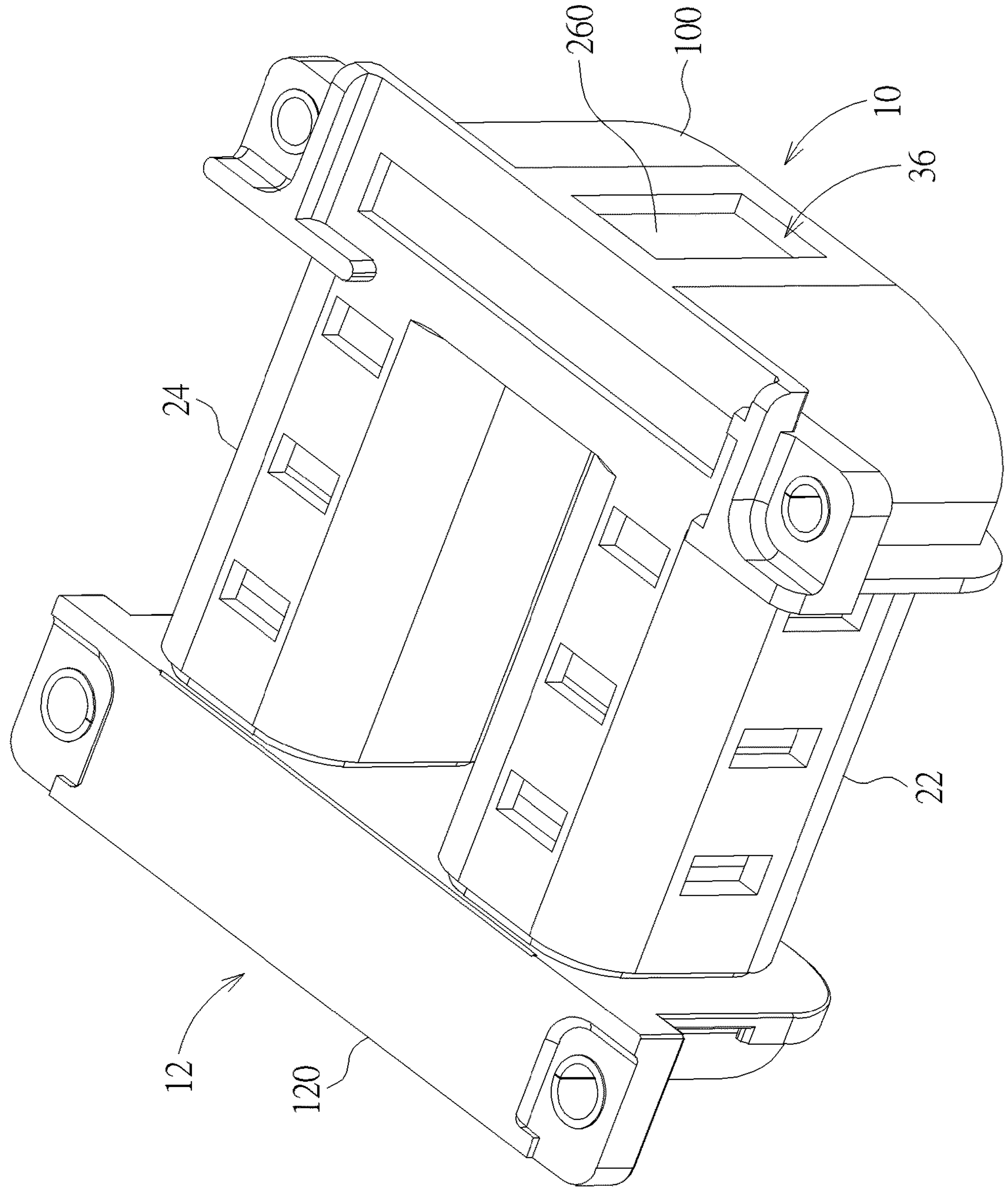
FIG. 12 is an assembly view illustrating a first core component and a second core component according to another embodiment of the invention.
Figure 13:
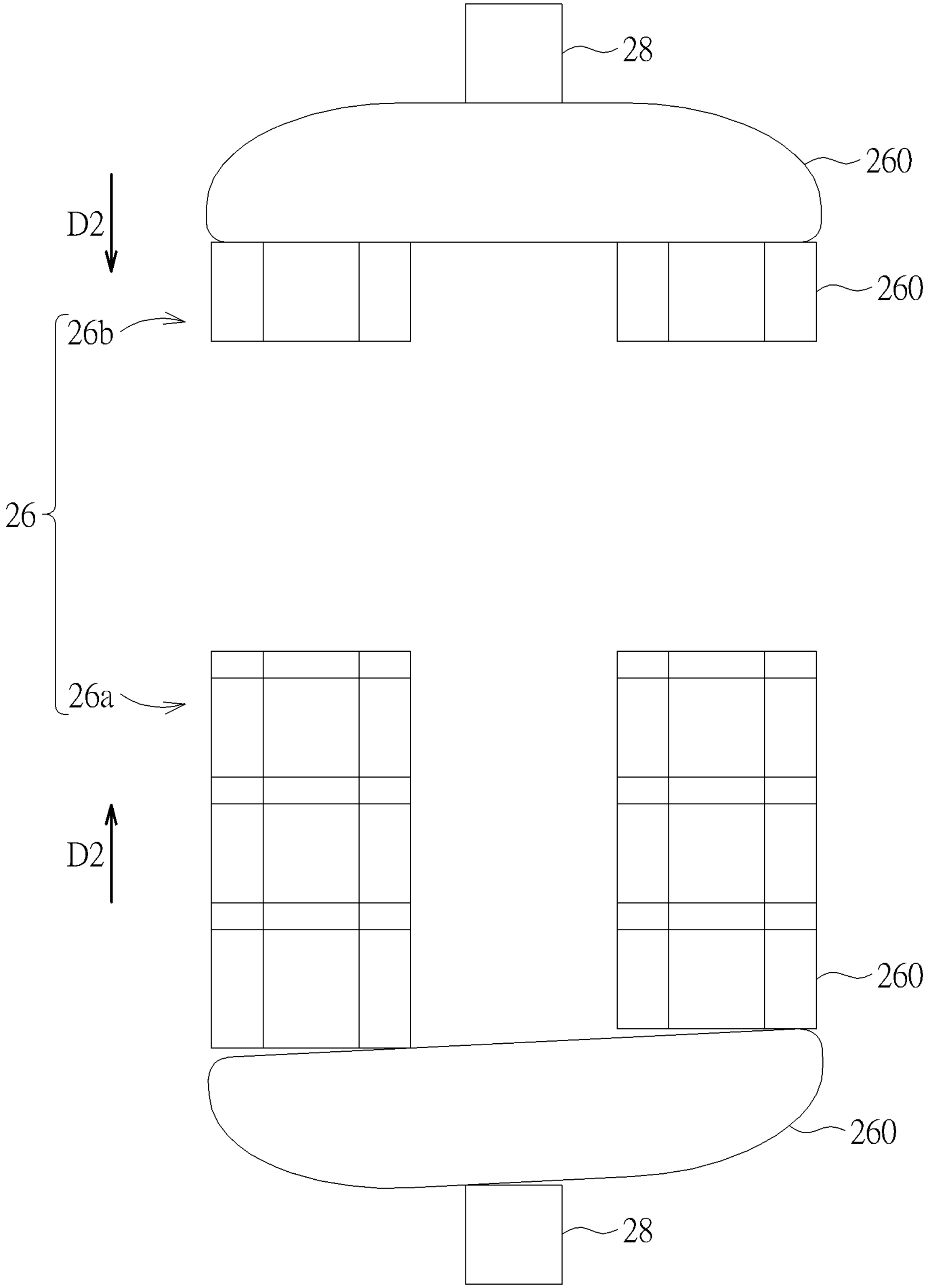
FIG. 13 is a front view illustrating a core set of the first core component and the second core component shown in FIG. 12.
Figure 14:
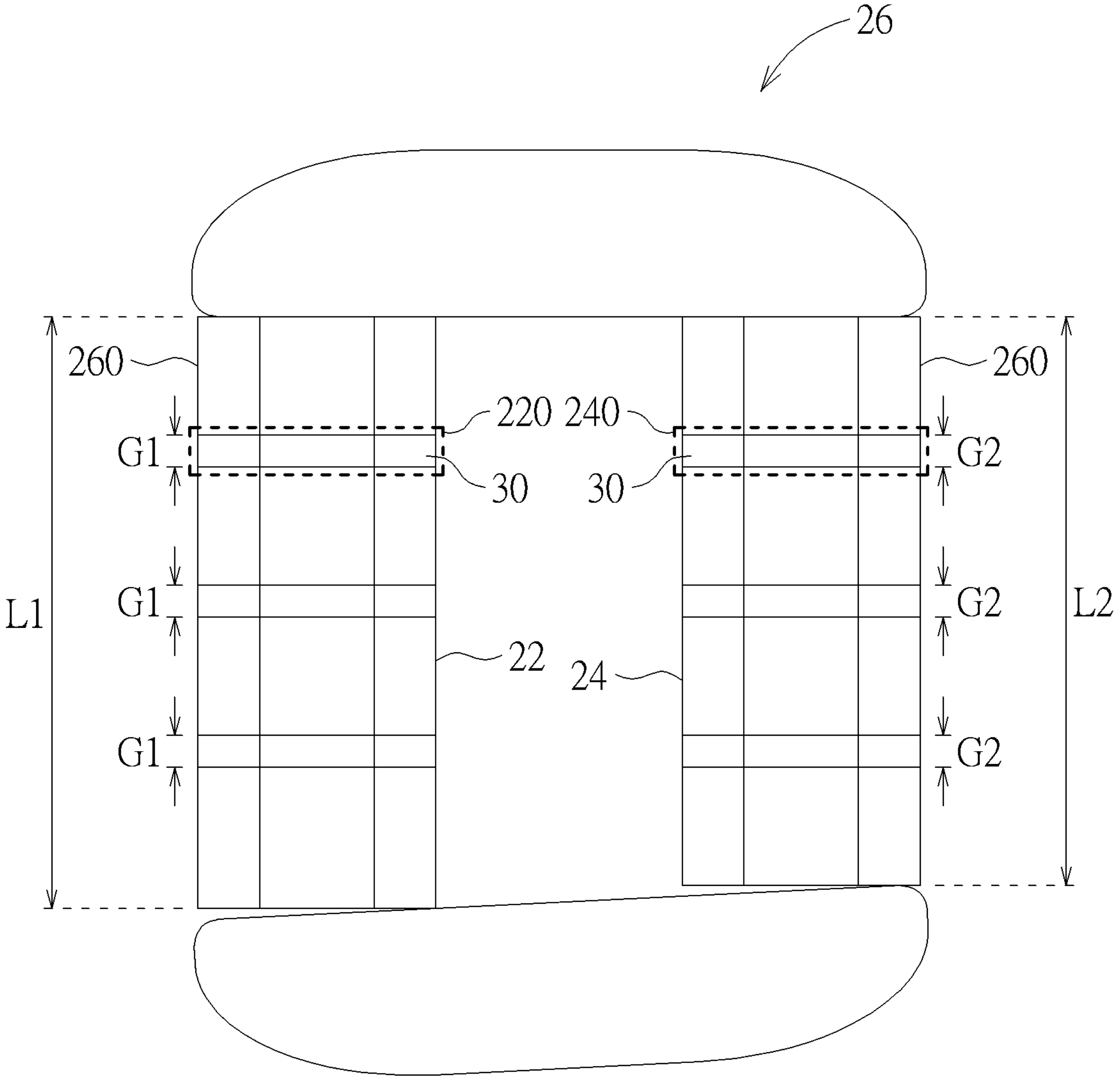
FIG. 14 is an assembly view illustrating the core set shown in FIG. 13.

Referring to FIGS. 12 to 14, FIG. 12 is an assembly view illustrating a first core component 10 and a second core component 12 according to another embodiment of the invention, FIG. 13 is a front view illustrating a core set 26 of the first core component 10 and the second core component 12 shown in FIG. 12, and FIG. 14 is an assembly view illustrating the core set 26 shown in FIG. 13.

The invention may replace the first core component 10 and the second core component 12 of the aforesaid magnetic component 1 by the first core component 10 and the second core component 12 shown in FIG. 12. As shown in FIGS. 12 and 13, the invention utilizes an injection molding process to form the first molding bobbin 100 covering the first part 26*a* of the core set 26 and form the second molding bobbin 120 covering the second part 26*b* of the core set 26. As shown in FIG. 13, the invention may place the first part 26*a* of the core set 26 into a mold (not shown). In the mold, an ejector pin 28 abuts against the cores 260, such that the cores 260 are stacked with each other in a direction D2 toward an inside of the magnetic component 1. Then, the invention performs an injection molding process to form the first molding bobbin 100 covering the first part 26*a* of the core set 26. Similarly, as shown in FIG. 13, the invention may place the second part 26*b* of the core set 26 into another mold (not shown). In the mold, an ejector pin 28 abuts against the cores 260, such that the cores 260 are stacked with each other in a direction D2 toward an inside of the magnetic component 1. Then, the invention performs an injection molding process to form the second molding bobbin 120 covering the second part 26*b* of the core set 26. Accordingly, after the first core component 10 is assembled with the second core component 12, each of the first pillar 22 and the second pillar 24 comprises a plurality of cores 260 stacked with each other in the direction D2 toward the inside of the magnetic component 1, and a length L1 of the first pillar 22 is larger than a length L2 of the second pillar 24, as shown in FIG. 14.

In this embodiment, the invention stacks the cores 260 with each other in the direction D2 toward the inside of the magnetic component 1, so as to make the length L1 of the first pillar 22 larger than the length L2 of the second pillar 24, thereby reducing the tolerance of the gap within the first pillar 22 and the second pillar 24, or/and reducing the tolerance of the magnetic path. In this embodiment, the first and second molding bobbins 100, 120 may be thicker to maintain the shape of the magnetic component 1, such that the magnetic component 1 will not be affected by the shape tolerance of the core set 26 after assembly. After assembly, no matter whether there is a gap existing within the first pillar 22 and the second pillar 24, the tolerance of the magnetic path will be small. In another embodiment, the first pillar 22 may have at least one first gap G1 or/and the second pillar 24 may have at least one second gap G2, wherein a total of the at least one first gap G1 is as large as a total of the at least one second gap G2. It should be noted that the same elements in FIGS. 12-14 and FIGS. 1-11 are represented by the same numerals, so the repeated explanation will not be depicted herein again.

As shown in FIG. 14, the first pillar 22 may have three first gaps G1 and the second pillar 24 may have three second gaps G2, wherein the three first gaps G1 are distributed in the first pillar 22, the three second gaps G2 are distributed in the second pillar 24, and the total of the three first gaps G1 is as large as the total of the three second gaps G2. In some embodiments, the first pillar 22 may have a single first gap G1, the second pillar 24 may have a single second gap G2, and the single first gap G1 is as large as the single second gap G2. In some embodiments, there may be spacer sheets 30 disposed in the first gaps G1 or/and the second gaps G2. In some embodiments, the first molding bobbin 100 and the second molding bobbin 120 (as shown in FIG. 12) may be doped with magnetic powders. In some embodiments, the first gaps G1 and the second gaps G2 may be omitted, such that the invention may reduce the tolerance of the magnetic path due to the tolerance of the cores 260.

As shown in FIGS. 12 and 14, the first molding bobbin 100 has an opening 36 away from each of the joints 220, 240 of the first pillar 22 and the second pillar 24, and one of the cores 260 is exposed from the opening 36. Similar to the opening 36 of the first molding bobbin 100, the second molding bobbin 120 also has an opening (not shown) away from each of the joints 220, 240 of the first pillar 22 and the second pillar 24, and one of the cores 260 is exposed from the opening. The position of the opening 36 corresponds to the position of the ejector pin 28 shown in FIG. 13 and the opening 36 is formed during the injection molding process. After the injection molding process, one of the cores 260 is exposed from the opening 36. It should be noted that the invention may dispose more ejector pins at other positions in the mold, such that parts of the cores 260 will be exposed after the injection molding process to improve heat dissipating efficiency.

As mentioned in the above, the invention utilizes the injection molding process to form the first molding bobbin and the second molding bobbin covering the core set and then assembles the first core component with the second core component to form the first pillar and the second pillar. In an embodiment, the invention may stack the cores with each other in a direction toward an outside of the magnetic component, so as to form the first gap and the second gap at the joints of the first pillar and the second pillar, wherein the first gap is larger than the second gap. The first gap and the second gap can be used to absorb the tolerances of the cores or/and spacer sheets, so as to reduce the length difference between the first pillar and the second pillar. Accordingly, the lengths of the first pillar and the second pillar will be substantially the same after assembly. Furthermore, since the shape tolerance of the core set or/and spacer sheet set is small after assembly, the molding bobbin may be thinner to reduce the height or width of the magnetic component. In another embodiment, the invention may stack the cores with each other in a direction toward an inside of the magnetic component, so as to make the length of the first pillar larger than the length of the second pillar, thereby reducing the tolerance of the gap within the first pillar and the second pillar, or/and reducing the tolerance of the magnetic path. In this embodiment, the molding bobbin may be thicker to maintain the shape of the magnetic component, such that the magnetic component will not be affected by the shape tolerance of the core set or/and spacer sheet set after assembly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A magnetic component comprising:

a first core component comprising:

a first molding bobbin covering a first part of a core set by an injection molding process;

a second core component comprising:

a second molding bobbin covering a second part of the core set by the injection molding process, the first core component being assembled with the second core component to form a first pillar and a second pillar, each of the first pillar and the second pillar comprising a plurality of cores stacked with each other in a direction toward an inside of the magnetic component, a length of the first pillar being larger than a length of the second pillar;

at least one coil being wound on at least one of the first pillar and the second pillar;

a first outer flange structure disposed at a joint of the first pillar of the first core component or the second core component and located between the plurality of cores; and a second outer flange structure disposed at a joint of the second pillar of the first core component or the second core component and located between the plurality of cores;

wherein the first outer flange structure and the second outer flange structure are parts of the first molding bobbin and the second molding bobbin;

wherein the first outer flange structure and the second outer flange structure prevent tolerance of the plurality of cores from affecting shapes of the first core component and the second core component.

2. The magnetic component of claim 1, wherein a shape of the first core component is identical to a shape of the second core component.

3. The magnetic component of claim 1, wherein each of the first molding bobbin and the second molding bobbin has an opening away from each of the joints of the first pillar and the second pillar, and one of the cores is exposed from the opening.

4. The magnetic component of claim 1, further comprising:

a base;

a first fixing component configured to fix the first core component on the base; and a second fixing component configured to fix the second core component on the base;

wherein joints of the first core component and the second core component are opposite to each other without being fixed.

5. The magnetic component of claim 1, wherein the first pillar has at least one first gap, the second pillar has at least one second gap, and a total of the at least one first gap is as large as a total of the at least one second gap.

6. The magnetic component of claim 5, further comprising:

a first spacer structure disposed in the first gap; and a second spacer structure disposed in the second gap, a thickness of the first spacer structure being as large as a thickness of the second spacer structure.

7. The magnetic component of claim 6, wherein the first spacer structure and the second spacer structure are injection molding materials formed by the injection molding process.

8. The magnetic component of claim 6, wherein the first spacer structure and the second spacer structure are spacer sheets.

9. The magnetic component of claim 1, wherein the core set has a winding portion and a non-winding portion, a first width of the winding portion is larger than a second width of the non-winding portion, a third width of the winding portion is smaller than a fourth width of the non-winding portion, and a product of the first width and the third width is equal to a product of the second width and the fourth width.

10. The magnetic component of claim 1, further comprising a plurality of spacer sheets, each of the spacer sheets being located between two of the cores.

11. The magnetic component of claim 10, wherein the cores and the spacer sheets are connected by adhesive or connected by the injection molding process.

12. The magnetic component of claim 10, wherein a filling space exists between the core and an indented structure of the spacer sheet, such that an injection molding material is filled in the filling space by the injection molding process.

13. The magnetic component of claim 1, further comprising a temperature sensor disposed adjacent to the at least one coil, at least one recess being formed on at least one inner surface of the first molding bobbin and the second molding bobbin, the temperature sensor being disposed at a position corresponding to the at least one recess, the recess being configured to accommodate at least a part of the at least one coil.

14. The magnetic component of claim 13, further comprising:

a holder disposed adjacent to the at least one coil; and a thermal conductive member disposed on the holder, the temperature sensor being disposed on the thermal conductive member.

15. The magnetic component of claim 1, wherein the first outer flange structure is disposed between longitudinal cores in the first pillar, and the second outer flange structure is disposed between longitudinal cores in the second pillar.

16. The magnetic component of claim 1, wherein there is no gap between longitudinal cores of the first and second pillars and a first transverse core, and there is no gap between the longitudinal cores of the first and second pillars and a second transverse core.

17. The magnetic component of claim 1, wherein there are only two joints of the first and second pillars between the first core component and the second core component.

18. The magnetic component of claim 1, wherein the plurality of cores is divided into a first part of the first core component and a second part of the second core component, and the first part and the second part are stacked with each other in two opposite directions.

* * * * *